United States Patent
Schwartz et al.

(10) Patent No.: US 6,168,072 B1
(45) Date of Patent: Jan. 2, 2001

(54) EXPANSION AGENT ASSISTED DIFFUSION BONDING

(75) Inventors: Daniel S. Schwartz, University City; Donald A. Deuser, Florissant, both of MO (US)

(73) Assignee: The Boeing Company, St. Louis, MO (US)

(*) Notice: Under 35 U.S.C. 154(b), the term of this patent shall be extended for 0 days.

(21) Appl. No.: 09/176,424

(22) Filed: Oct. 21, 1998

(51) Int. Cl.[7] .................... B23K 20/00; B23K 28/00; B23K 31/02; C22B 1/00; C22B 1/14
(52) U.S. Cl. .................. 228/235.1; 228/193; 228/115; 75/746; 148/513; 148/516; 419/48
(58) Field of Search ................. 75/746; 148/513, 148/516; 228/115, 6, 118, 193, 235.1; 269/43, 156

(56) References Cited

U.S. PATENT DOCUMENTS

| | | |
|---|---|---|
| 3,087,807 | 4/1963 | Allen et al. ............................ 75/20 |
| 3,992,200 | 11/1976 | Chandhok ............................ 75/211 |
| 4,659,546 * | 4/1987 | Kearns ................................. 419/2 |
| 4,724,123 | 2/1988 | Rozmus, Jr. ......................... 419/68 |
| 4,761,262 | 8/1988 | Ogata et al. ......................... 419/10 |
| 4,781,886 | 11/1988 | Patrician et al. ..................... 419/49 |
| 5,004,653 | 4/1991 | Kroisenbrunner ................... 428/615 |
| 5,151,246 * | 9/1992 | Baumeister et al. .................. 419/2 |
| 5,174,143 | 12/1992 | Martin ................................... 72/53 |
| 5,302,340 | 4/1994 | Takeda ................................ 419/45 |
| 5,366,686 | 11/1994 | Mortensen et al. .................... 419/5 |
| 5,393,485 | 2/1995 | Wörz et al. .......................... 419/41 |
| 5,564,064 * | 10/1996 | Martin .................................. 419/5 |
| 5,607,778 * | 3/1997 | Padden .............................. 428/613 |
| 5,609,471 * | 3/1997 | Frasier et al. ................... 416/204 A |

OTHER PUBLICATIONS

R. Terrence Webster, ASM Handbook V6: Welding, Brazing & Soldering, Jun. 1995, p. 783.*
Mahoney, et al., Fundamentals of Diffusion Bonding ASM Handbook, Dec. 1993, pp. 156–159.
American Society for Metals, "Fundamentals of Solid State Welding," Metals Handbook Ninth Edition, Aug. 1983, pp.680–691.

* cited by examiner

*Primary Examiner*—Patrick Ryan
*Assistant Examiner*—Colleen Cooke
(74) *Attorney, Agent, or Firm*—Bryan Cave LLP

(57) ABSTRACT

The present invention provides a method of diffusion bonding a first article containing a thermally activated expansion agent to a second article. The first article and the second article are placed adjacent to each other at a bonding area. The first article and the second article are constrained such that contact is maintained between the first article and the second article at the bonding area. The constrained articles are then heated at a temperature that causes the first article to expand, creating pressure between the articles at the bonding area.

22 Claims, 1 Drawing Sheet

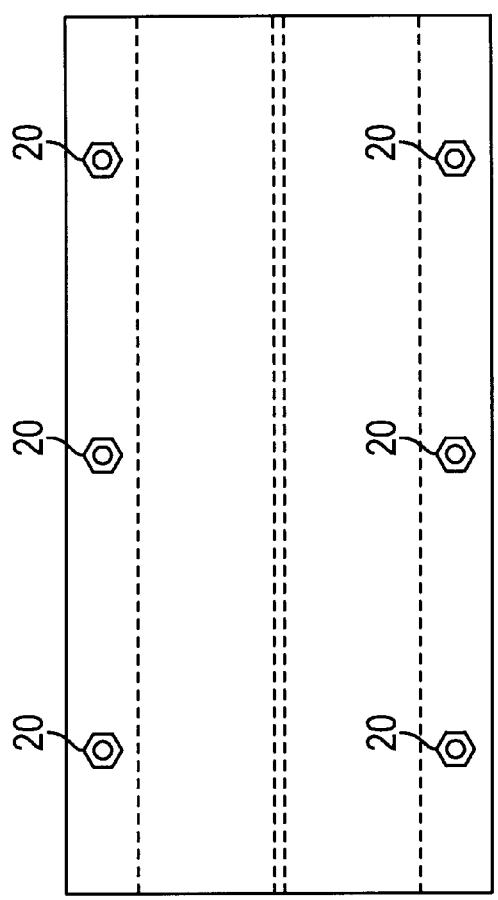
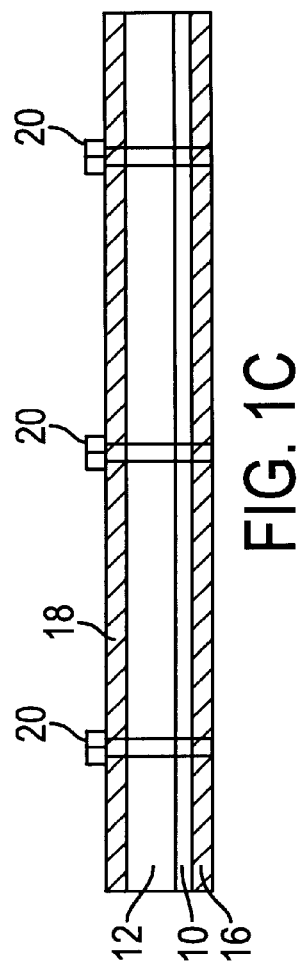
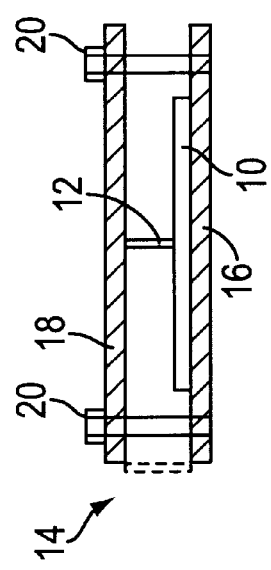

EXPANSION AGENT ASSISTED DIFFUSION BONDING

BACKGROUND OF THE INVENTION

This invention relates to diffusion bonding, and more particularly to the use of the thermally activated expansion agents for diffusion bonding of porous articles.

Methods for manufacturing porous articles using thermal expansion of embedded agents have previously been developed. For example, Kearns U.S. Pat. No. 4,659,546 describes a method of manufacturing a porous body using thermal expansion of entrapped gas to create discrete internal porosity and to reduce the overall density of the body. Another example is described in Allen et al. U.S. Pat. No. 3,087,807, which teaches a method of producing a porous metal body using a thermally activated gas-emitting powder to create porosity. Porous articles manufactured using such prior art methods are typically processed first into an intermediate non-porous form, and the porosity is introduced into the article by subsequently annealing the article at an appropriate temperature. The annealing process causes the expansion agent to expand and form porosity throughout the article, which further causes the dimensions of the porous article to increase.

In the manufacture of porous articles, it is frequently necessary to attach the porous article to other articles or parts (e.g., stiffeners, stringers, sleeves, panels, sheets, rods, blocks, spheres, tees, bolts, lugs, hinges, lands, struts, coverings, hardware, etc.) to a parent porous article. Heretofore, such composite articles have been manufactured utilizing at least a two-step process. First, the parent porous article is manufactured as described above using an annealing process. The part is then bonded to the parent using conventional welding and bonding techniques. This two-step process typically involves at least two heating steps, one in conjunction with the annealing required to create the porous article, and a second heating of the bonding surfaces during conventional fusion or diffusion bonding processes. Thus, the conventional manufacturing process is inefficient in that it requires two separate manufacturing steps, and requires the expense and delay of two separate heat treatments.

Moreover, many conventional fusion bonding techniques such as brazing and tungsten-inert gas (TIG) or oxyacetylene welding are inappropriate for applications utilizing porous metallic articles, such as aerospace manufacturing, which require high strength bonds with minimal deformation to component articles. Fusion bonding methods such as these involve localized melting, which causes deformation and microstructural changes that weaken porous metallic articles. Unlike conventional methods of fusion welding, diffusion bonding is a process that produces solid state coalescence between two materials. In diffusion bonding, joining occurs at a temperature below the melting point of the materials to be joined. Coalescence is produced with loads below those that would cause macroscopic deformation of the article. Thus, diffusion bonding is often preferred in applications such as aerospace manufacturing because it produces components with no abrupt discontinuity in the microstructure and with minimal deformation.

A disadvantage of conventional methods of diffusion bonding is that they are relatively complex and typically require expensive equipment to create pressure required for bonding. For example, bonding pressure is often created by metal or rubber bladders inflated with either a gas or liquid. This technique requires sophisticated plumbing and connections to avoid leakage. Bonding pressure is also conventionally created through use of a hydraulic hot press, where the press applies pressure to a die containing the parts to be bonded. The primary disadvantage of this method is that hydraulic presses are generally very expensive (multimillion dollar) tools. Hence, there is a need for a method of diffusion bonding that produces the bond without expensive pressurizing equipment such as inflatable bladders and the hot presses.

Another disadvantage of conventional methods of diffusion bonding is that they typically require exacting surface preparation and expensive tools and dies to ensure the proper amount of pressure and intimate contact between the articles to be joined. Hence, there is a need for a method of diffusion bonding that produces proper bonding pressure while correcting imperfections at the faying surfaces.

For the foregoing reasons, there is a strong need for an improved method of diffusion bonding of parts to porous articles that 1) produces bonds with no abrupt discontinuity in the microstructure and minimal deformation, 2) does not require an additional bonding or heating step, 3) obviates the need for expensive pressurizing equipment, and 4) reduces the amount of surface preparation by correcting imperfections at the faying surfaces. Such a method would substantially reduce the cost of manufacturing composite porous articles.

SUMMARY OF THE INVENTION

The method of diffusion bonding of the present invention preferably comprises the principal steps of placing at least a first article, containing a thermally activated expansion agent, adjacent to at least a second article at a bonding area; constraining the articles at the bonding area such that contact is maintained between the articles at the bonding area; and heating the articles at a temperature that causes at least the first article to expand, thereby creating pressure between the articles at the bonding area.

Under the method of the present invention, articles are preferably joined by diffusion bonding at temperatures below that which is required for fusion welding techniques, in which the bond region is melted. As a result, the bond can be made with relatively little detrimental effect upon the base microstructure of the porous article. One of the many advantages of the method of the present invention is that it can preferably be accomplished concurrently with the annealing step required to create porosity in an article containing a thermally activated expansion agent. Therefore, the cost of bonding the articles is reduced because fewer manufacturing steps are required and only a single heating is needed. Another advantage of the preferred method described herein is that it utilizes pressure or force resulting from the expansion of the expansion agent, thereby eliminating the need for expensive pressurizing equipment required in conventional diffusion bonding techniques. Additionally, under the method of the present invention, expansion of the porous article preferably fills initial areas of non-contact between the articles at the bonding area due to imperfect mating. As such, the method of the present invention reduces or may eliminate the need for surface preparation.

DRAWINGS

These, and other features, aspects and advantages of the present invention will become more fully apparent from the following detailed description, appended claims, and accompanying drawings where:

FIG. 1A is a top view showing one embodiment of a constraining apparatus adapted for use in the method of the present invention;

FIG. 1B is a front view showing one embodiment of a constraining apparatus adapted for use in the method of the present invention;

FIG. 1C is a side view showing one embodiment of a constraining apparatus adapted for use in the method of the present invention.

DETAILED DESCRIPTION OF THE INVENTION

As used herein, the term "diffusion bonding" means the process of applying temperature and pressure to an interface for a prescribed period of time to produce solid-state coalescence between two materials.

The method of diffusion bonding of the present invention preferably comprises the principal steps of placing at least a first article, containing a thermally activated expansion agent, adjacent to at least a second article at a bonding area; constraining the articles at the bonding area such that contact is maintained between the articles at the bonding area; and heating the articles at a temperature that causes at least the first article to expand, thereby creating pressure between the articles at the bonding area.

The preferred embodiment of the method of the present invention may be used to bond various materials to any porous material containing any thermally activated expansion agent.

In one preferred embodiment, the material containing a thermally activated expansion agent may be, for example, any material produced through the initial stages of the process described in Kearns U.S. Pat. No. 4,659,546, which is incorporated herein by reference in its entirety, prior to the heat treating/expansion stage. Kearns describes a method of manufacturing a porous body using entrapped gas to create discrete internal porosity and reduce the overall density of the body. According to Kearns, a method of manufacturing a porous body includes the stages of placing a quantity of particulate material in a gas-tight container, evacuating the container, admitting to the container a gas (preferably an inert gas such as argon or helium), compacting the particulate material to form a compact within the container under a pressure which would result in the particulate material being bonded together around discrete gas-containing pores and also reduces the volume of the initially formed pores within the compact so that the gas in the pores is at a higher pressure than that in the initially formed pores. The compact can then be heat treated at a temperature within a range which permits the pressure within the pores to exceed the material flow stress and thereby expand to provide a porous body. The particulate material used to form the material containing entrapped pressurized gas may preferably be a metal or a metal alloy, a cement, a plastics substance or a ceramic substance or any other material which can exist in particulate form and be compacted so as to bond the particulate material together. The method may be particularly suitable for the production of porous bodies of metals or their alloys.

In another preferred embodiment, the material containing a thermally activated expansion agent may be, for example, any material produced through the initial stages of the process described in Allen et al. U.S. Pat. No. 3,087,807, which is incorporated herein by reference in its entirety, prior to the heat treating stage. Allen describes a method of manufacturing a porous body by mixing a powdered structural metallic material of metal or metal alloy (e.g., aluminum, iron-base alloys, nickel-base alloys, copper-base alloys, or magnesium-base alloys) with a gas-forming material (e.g., calcium carbonate, zirconium hydride or titanium hydride). According to Allen, the gas-forming material preferably releases a substantial amount of gas at about the melting temperature of the powdered metal. The mixture of gas-forming material and powdered structural metallic material is then extruded, preferably after being cold compacted, under sufficient heat and pressure to consolidate the metal of the mixture and the resulting gas-forming material embedded in the resulting metal matrix. The resulting extruded material can then heated in a controlled manner so as to produce a foam.

In the present invention, the articles to be bonded may be composed of the same or different material, based upon the desired application of the composite product to be produced. In one embodiment articles of metals or their alloys are bonded to porous articles of metals or their alloys. In another embodiment, the method is employed to bond those metals and metal alloys having a high solubility for interstitial contaminants such as oxygen. Metals such as titanium, copper, iron, zirconium, niobium, tantalum, tungsten, and silver fall into this category and are easiest to diffusion bond, and therefore are particularly suited for the method of the present invention. Other metals or materials producing bonds of varying structural strength may be suitable in some applications. It should be recognized the method may be employed to bond two articles both containing thermally activated expansion agents.

Though the method of the present invention is described in the example below in the context of specific articles, it should be recognized that the present invention may be used to bond articles of various shapes and forms including, for example, stiffeners, stringers, sleeves, panels, sheets, rods, blocks, spheres, tees, bolts, lugs, hinges, lands, struts, coverings, hardware, etc. In the example described below, the bonding area encompasses only a small portion of the surface area of the porous metal panel. Those skilled in the art will appreciate that the size of the bonding area will depend upon the ultimate product desired. For example, the present invention may be used in one embodiment to bond two sheets together along the entire surface area of a side of the sheets. In another embodiment, the method of the present invention may also be used to bond a portion of an article containing a thermally activated expansion agent to another portion of the article itself.

The step of constraining the first and second articles is preferably accomplished by a constraining means that maintains contact between the articles at the desired bonding area. Contact is preferably maintained through the heating/expansion step such that pressure is created between the articles at the bonding area. In one preferred embodiment, the articles to be bonded are constrained by a mechanical constraining apparatus. However, it should be recognized that the constraint may be accomplished in any number of ways, for example, by any means capable of maintaining contact at the bonding area throughout the bonding process, such that pressure is formed between the two articles during expansion of the article containing a thermally activated expansion agent.

In one embodiment constrained articles are preferably heated in an oxygen-free environment because, as is well known in the art, oxidation impedes diffusion bonding of metals. This oxygen free environment may be produced in a variety of ways, for example, in one embodiment it is preferably produced by heating in an evacuated vacuum oven, and in another embodiment it is preferably produced by heating in an inert gas environment.

In a preferred embodiment, the heat treatment expands the article containing a thermally activated expansion agent while simultaneously providing heat necessary to facilitate diffusion bonding. The heat treatment is preferably carried out at temperatures and for periods of time sufficient to expand thermally activated expansion agent to form permanent voids or channels in the material. This period of time will generally be sufficient to allow the articles to fully diffusion bond. The heat treatment is preferably at a temperature below the melting point of the material so that proper diffusion bonding may occur. The specific conditions for heat treatment will vary depending upon the particular compositions and configurations of the materials to be bonded. For example, typical heat treatment for the expansion and bonding articles composed of Ti-6Al-4V and containing entrapped pressurized gas preferably consist of heating at approximately 850° C. to 950° C. for a period of 8 to 24 hours.

In a preferred embodiment, the expansion of the porous article due to the heat treatment causes it to press against the article to be bonded. As a result of the expansion of the porous article and the constraint of the two articles, pressure or force preferably builds in contact area between the two articles. The combination of the heat, pressure and time allow the two articles to diffusion bond. The expansion of the porous article preferably ensures that any areas of non-contact between the articles due to imperfect mating will be filled in, and contact during the bonding/expansion step will be uniform.

The invention will be further clarified by a consideration of the following example, which is intended to be purely exemplary of the use of the invention.

EXAMPLE

This example describes use of the method for attachment of a simple fin stiffener to a flat panel of porous metal. However, it should be recognized that the method can easily be adapted to other shapes and materials, and is no way restricted to the specific application described here.

Referring now to FIGS 1A, 1B and 1C. A porous panel 10 is an unexpanded article of the alloy Ti-6Al-4V containing entrapped pressurized gas. The panel 10 comprises a Low Density Core (LDC), produced by the entrapped gas method. Under this method, metal alloy powder (pre-alloyed Ti-6Al-4V) is placed into a canister, typically manufactured from the same alloy as the powder. The canister is then pressurized with argon gas to 1–8 atmospheres of pressure. The canister is sealed with argon gas and metal powder inside, and then hot isostatically pressed at 15 ksi/1100° C. for six hours. Pressing the powder metal in this manner causes it to completely consolidate into a fine-grained solid. After this step the canister is approximately 98% solid. The entrapped gas has been compressed to approximately 1000 times less than its original volume. The canister is then hot rolled into sheet form. The panel 10 is cut from the sheet, and can be further formed into complex shapes using standard metal forming techniques.

The surface of the panel 10 and the contact surface of the stiffening fin 12 of the same alloy as the panel 10 are prepared by grinding the surfaces with 600 grit SiC sandpaper to remove surface contamination, and wiping with conventional degreasing solvent, e.g., acetone. The stiffening fin 12 is joined to the panel 10. A constraining apparatus 14 serves to hold the stiffening fin 12 in contact with the porous panel 10, and maintains the required 90° angle between the stiffening fin 12 and the porous panel 10 throughout the bonding process. The constraining apparatus 14 also serves to maintain the stiffener height (h) within the required tolerance of the finished part. The constraining apparatus 14 is composed of a base 16, a clamping plate 18, and a series of pressure bolts 20. Pressure bolts may be added as needed for a particular configuration. A conventional release agent such as boron nitride is applied to the articles 10 and 12 and the constraining apparatus 14 to prohibit the articles 10 and 12 from bonding to constraining apparatus 14. The panel 10 and the stiffening fin 12 are arranged between the base 16 and the clamping plate 18 in the desired configuration. The pressure bolts 20 are then uniformly tightened to firmly hold the assembly so that it can easily be moved without slippage.

The entire assembly (panel 10, stiffening fin 12, and constraining apparatus 14) is placed into a conventional vacuum furnace operating at a vacuum level of approximately $10^{-5}$ torr. Alternatively, a flowing argon environment or other reactive gas excluding environment can be used in the furnace. The furnace is heated to the expansion temperature required to expand the porous panel 10, approximately 930° C. for a period of approximately 8 to 24 hours. During this annealing process the panel 10 expands about 20–30%, causing it to press against the stiffening fin 12. Because the constraining apparatus 14 constrains the entire assembly, pressure of approximately 1–8 atmospheres builds at the bonding area between the stiffening fin 12 and the panel 10. The expansion of panel 10 fills initial areas of non-contact between the stiffening fin 12 and the panel 10 due to imperfect mating, resulting in uniform contact during the bonding/expansion process. This uniform contact ensures a complete diffusion bond despite minor surface irregularities resulting in imperfect mating. A strong diffusion bond forms at the bonding area during the approximately 24 hours that it takes the panel 10 to fully expand.

It should be noted that in this example the thermal expansion of the materials in both the constraining apparatus and the joined part plays an insignificant role in pressing the stiffening fin into the porous panel to make the diffusion bond. The expansion of the porous panel due to the entrapped gas is typically ten time greater than the thermal expansion of any part of the assembly, so this gas-driven expansion dominates the thermal expansion, allowing a wide choice of materials for the apparatus and bonded part, without concern for the material's thermal expansion properties.

Though the present invention has been described in considerable detail with reference to certain presently preferred embodiments and a specific example thereof, other embodiments and examples will be apparent to those skilled in the art from consideration of this specification or practice of the invention disclosed herein. Among many other uses, the method of the present invention may be used to manufacture various articles for high stiffness-to-weight structures used in, for example, aerospace applications. Additional uses of the method of the present invention may include, for example, manufacturing parts for sports equipment where high stiffness-to-weight is desirable, such as bicycles and golf clubs. There may also be medical applications for the bonding method of the present invention, such as for the manufacture of implants for replacement or support of diseased or damaged bone. Therefore, the spirit and scope of the appended claims should not be limited to the description of the preferred embodiments or examples contained herein.

We claim:

1. A method of diffusion bonding at least a first article to at least a second article, the first article containing entrapped gas, the method comprising the steps of:
 a) placing the first article adjacent to the second article at a bonding area;
 b) constraining the first article and the second article such that contact is maintained between the first article and the second article at the bonding area; and
 c) heating the first article and the second article at a temperature that causes expansion of the entrapped gas within the first article to produce elevated expansion of the first article to create pressure between the first article and the second article at the bonding area sufficient to result in a diffusion bond.

2. The method of claim 1 wherein the entrapped gas comprises an inert gas.

3. A method of diffusion bonding at least a first article to at least a second article, the first article containing a thermally activated gas producing agent, the method comprising the steps of:
 a) placing the first article adjacent to the second article at a bonding area;
 b) constraining the first article and the second article such that contact is maintained between the first article and the second article at the bonding area; and
 c) heating the first article and the second article at a temperature that causes the thermally activated gas producing agent to produce gas resulting in elevated expansion of the first article to create pressure between the first article and the second article at the bonding area sufficient to result in a diffusion bond.

4. The method of claim 3 wherein the thermally activated gas producing agent comprises a material selected from the group consisting of calcium carbonate, zirconium hydride, and titanium hydride.

5. The method of claim 1 wherein the first article comprises metal or metal alloy.

6. The method of claim 1 or 5 wherein the second article comprises metal or metal alloy.

7. The method of claim 5 wherein the first article comprises a metal or metal alloy selected from the group consisting of titanium, copper, iron, zirconium, niobium, tantalum, tungsten, and silver.

8. The method of claim 6 wherein the second article comprises a metal or metal alloy selected from the group consisting of titanium, copper, iron, zirconium, niobium, tantalum, tungsten, and silver.

9. The method of claim 1 wherein the articles are constrained by a constraining apparatus.

10. The method of claim 1 wherein the articles are heated in an oxygen-free environment.

11. The method of claim 10 wherein the oxygen-free environment is a vacuum.

12. The method of claim 10 wherein the oxygen-free environment comprises an inert gas environment.

13. A method of diffusion bonding a first portion of an article to at least a second portion of the article, the article containing entrapped gas, the method comprising the steps of:
 a) placing the first portion of the article adjacent to the second portion of the article at a bonding area;
 b) constraining the first and the second portion of the article such that contact is maintained between the first portion of the article and the second portion of the article at the bonding area; and
 c) heating the article at a temperature that causes expansion of the entrapped gas within the first article to produce elevated expansion of the first article to create pressure between the first portion of the article and the second portion of the article at the bonding area sufficient to result in a diffusion bond.

14. The method of claim 13 wherein the entrapped gas comprises an inert gas.

15. A method of diffusion bonding a first portion of an article to at least a second portion of the article, the article containing a thermally activated gas producing agent, the method comprising the steps of:
 a) placing the first portion of the article adjacent to the second portion of the article at a bonding area;
 b) constraining the first and the second portion of the article such that contact is maintained between the first portion of the article and the second portion of the article at the bonding area; and
 c) heating the article at a temperature that causes the thermally activated gas producing agent to produce gas resulting in elevated expansion of the article to create pressure between the first portion of the article and the second portion of the article at the bonding area sufficient to result in a diffusion bond.

16. The method of claims 15 wherein the thermally activated gas producing agent comprises a material selected from the group consisting of calcium carbonate, zirconium hydride, and titanium hydride.

17. The method of claim 13 wherein the article comprises metal or metal alloy.

18. The method of claim 17 wherein the article comprises a metal or metal alloy selected from the group consisting of titanium, copper, iron, zirconium, niobium, tantalum, tungsten, and silver.

19. The method of claim 13 wherein the first portion of the article and the second portion of the article are constrained by a constraining apparatus.

20. The method of claim 13 wherein the article is heated in an oxygen-free environment.

21. The method of claim 20 wherein the oxygen-free environment is a vacuum.

22. The method of claim 20 wherein the oxygen-free environment comprises an inert gas environment.

* * * * *